W. L. WARD & G. M. RUDD.
NUT TAPPING MACHINE.
APPLICATION FILED DEC. 11, 1913.

1,130,123.

Patented Mar. 2, 1915.
8 SHEETS—SHEET 1.

WITNESSES:
Jesse A. Holton
C. F. Volk

INVENTORS
W. L. Ward and
G. M. Rudd
BY
Dull, Warfield & Dull
ATTORNEYS

W. L. WARD & G. M. RUDD.
NUT TAPPING MACHINE.
APPLICATION FILED DEC. 11, 1913.

1,130,123.

Patented Mar. 2, 1915.
8 SHEETS—SHEET 3.

W. L. WARD & G. M. RUDD.
NUT TAPPING MACHINE.
APPLICATION FILED DEC. 11, 1913.

1,130,123.

Patented Mar. 2, 1915.
8 SHEETS—SHEET 5.

W. L. WARD & G. M. RUDD.
NUT TAPPING MACHINE.
APPLICATION FILED DEC. 11, 1913.

1,130,123.

Patented Mar. 2, 1915.
8 SHEETS—SHEET 7.

WITNESSES:
Jesse A. Holton
E. F. Valk

INVENTORS
W. L. Ward and
G. M. Rudd
BY
Druell Barfield & Druell
ATTORNEYS

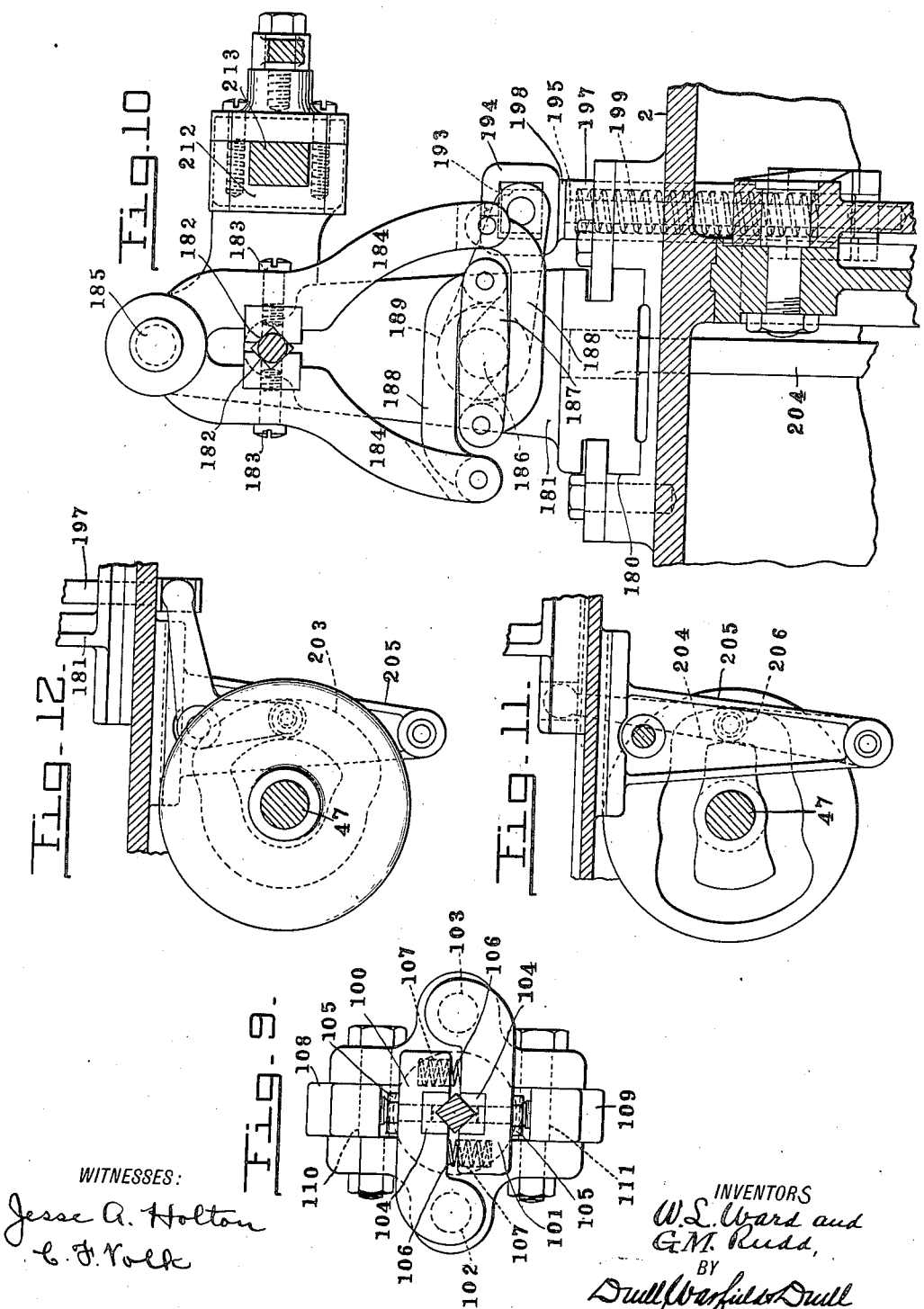

UNITED STATES PATENT OFFICE.

WILLIAM L. WARD AND GEORGE M. RUDD, OF PORT CHESTER, NEW YORK, ASSIGNORS TO RUSSELL, BURDSALL & WARD BOLT AND NUT CO., OF PORT CHESTER, NEW YORK, A CORPORATION OF NEW YORK.

NUT-TAPPING MACHINE.

1,130,123. Specification of Letters Patent. Patented Mar. 2, 1915.

Application filed December 11, 1913. Serial No. 805,897.

*To all whom it may concern:*

Be it known that we, WILLIAM L. WARD and GEORGE M. RUDD, citizens of the United States, residing at Port Chester, in the county of Westchester and State of New York, have invented certain new and useful Improvements in Nut-Tapping Machines, of which the following is a full, clear, and exact description, such as will enable others skilled in the art to which it appertains to make and use the same.

This invention relates to metal working machines, and with regard to certain more specific features thereof, to machines for cutting or finishing nut blanks as for a more specific instance a tapping machine for interiorly threading the bolt hole of a nut.

One of the objects of the invention is to provide highly durable automatic apparatus for the threading of nut blanks.

Another object of the invention is the provision of a practical machine of the character referred to involving a plurality of cutters or tappers, the cutting or tapping operation of one of the cutters or tappers being automatically effected during the stripping, or discharging, of a previously operated cutter, or tapper, thus enhancing the capacity of machines of the character referred to.

Still another object of this invention is the provision of means to minimize the possibility of fracture of the working parts of the machine, thereby, not only making for increased capacity by avoiding a discontinuance of operation to repair or replace parts, but saving the cost in labor and materials of said repairing or replacing of parts.

Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

Figure 1:
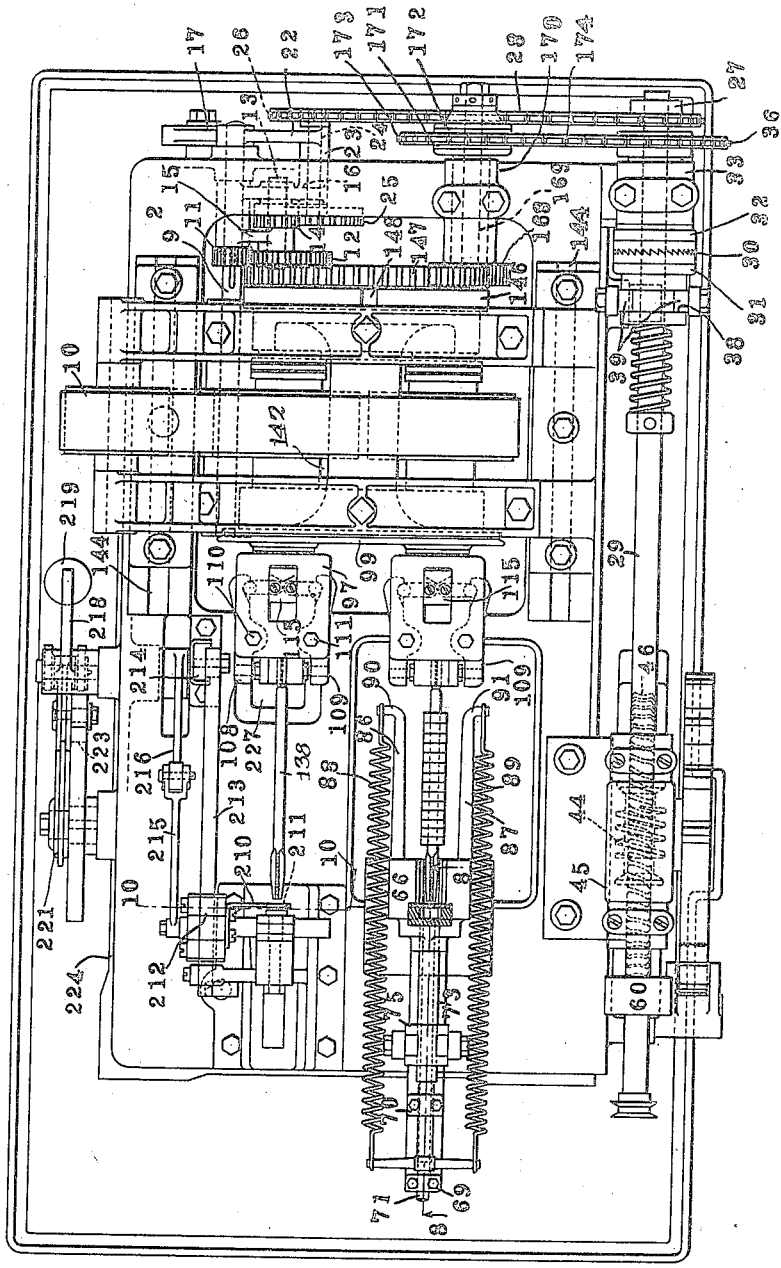
Figure 2:
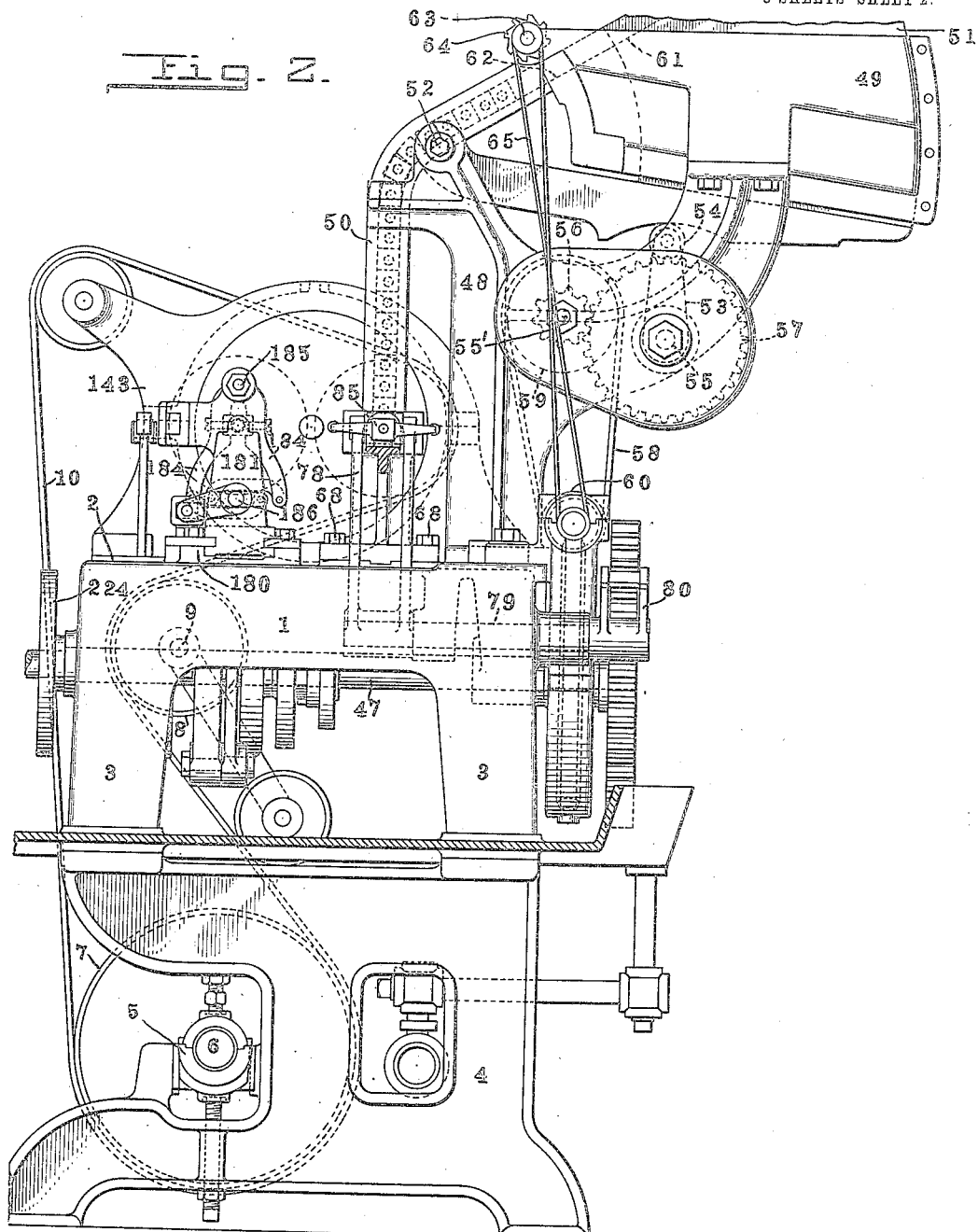
Figure 3:
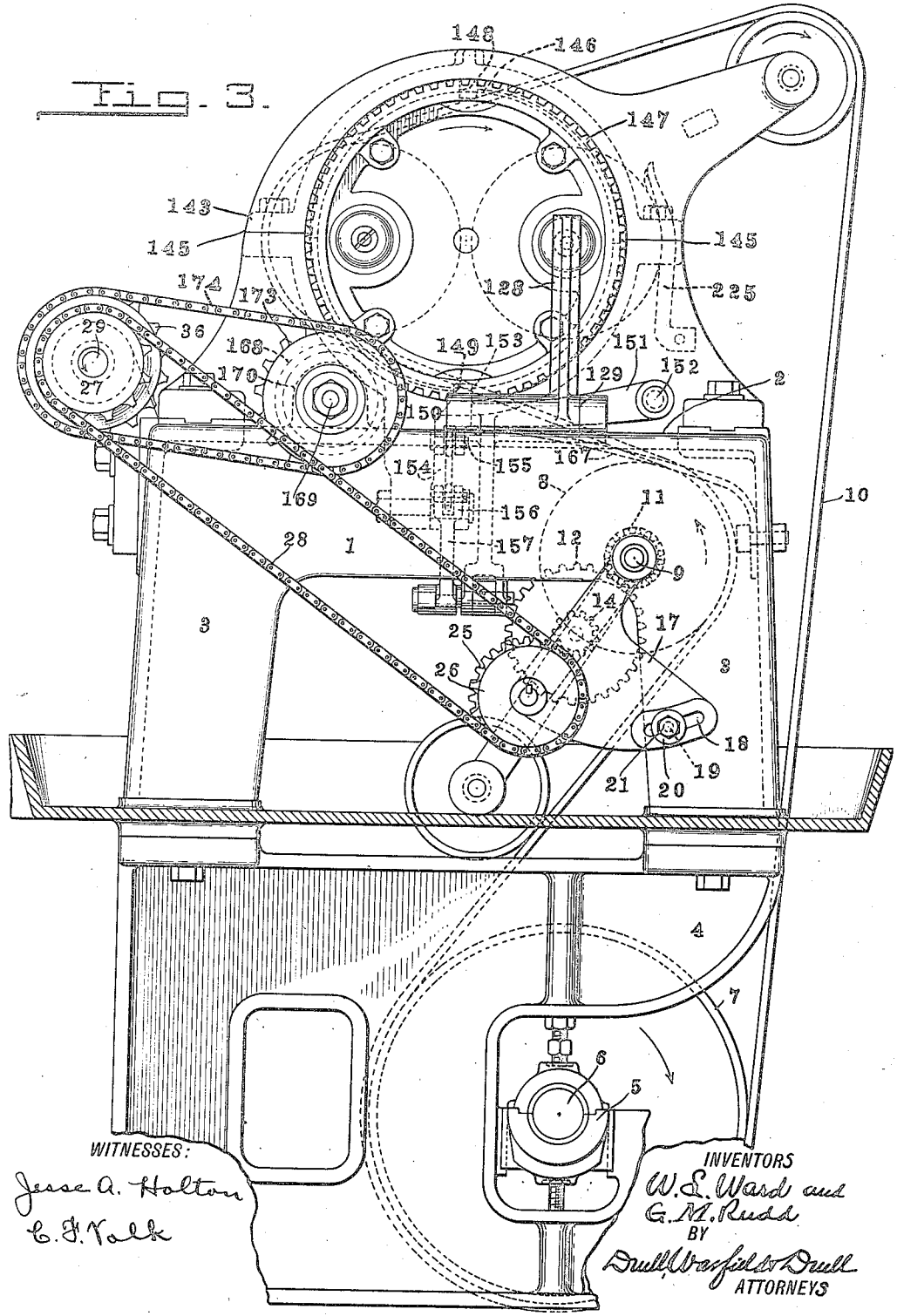
Figure 4:
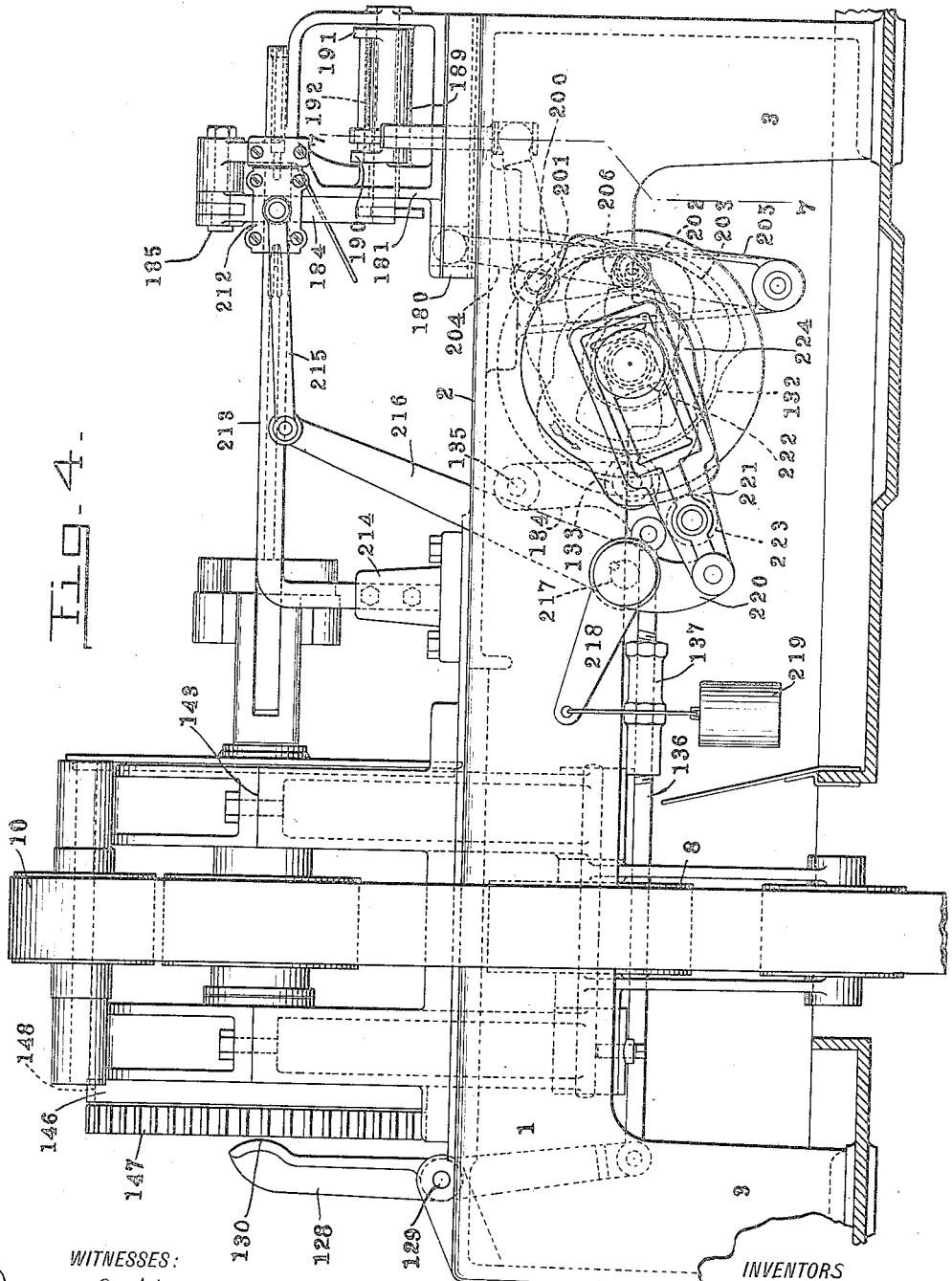
Figure 5:
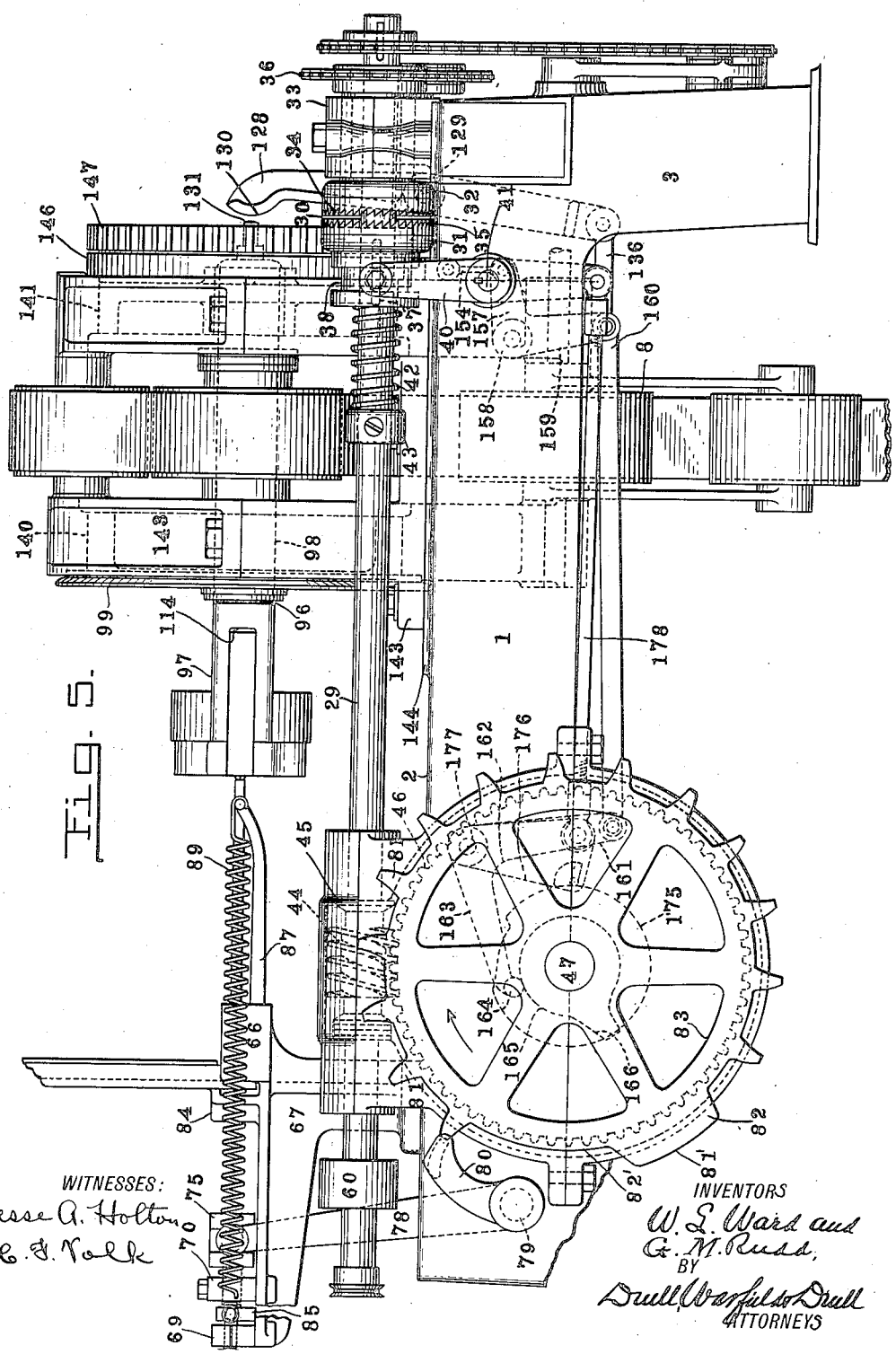
Figure 6:
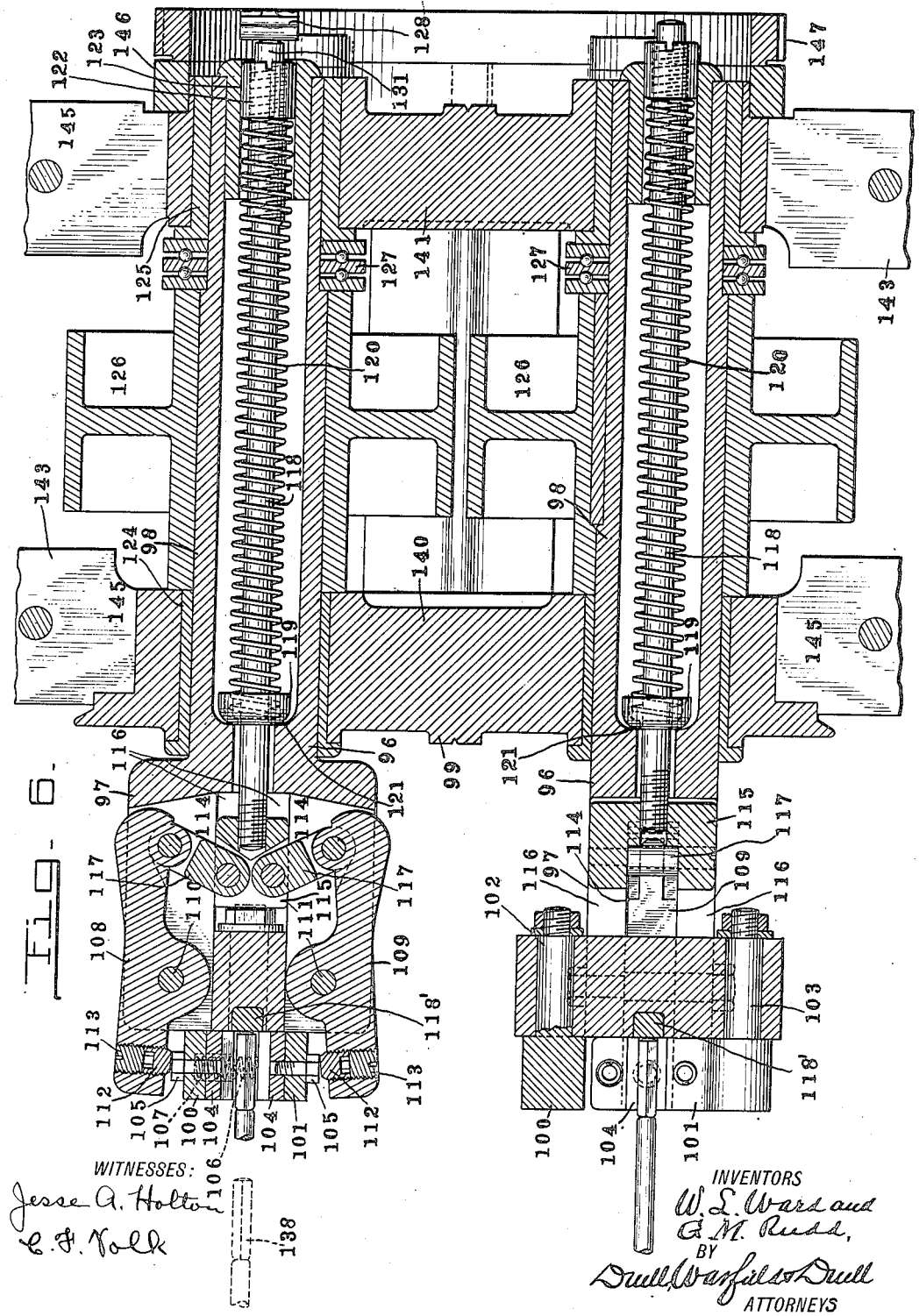
Figure 7:
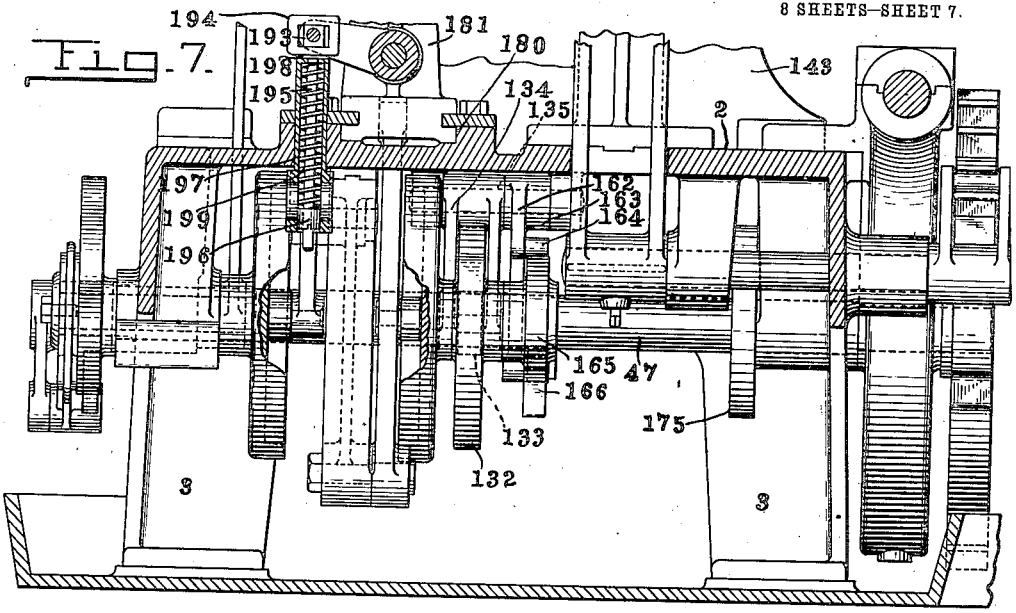
Figure 8:
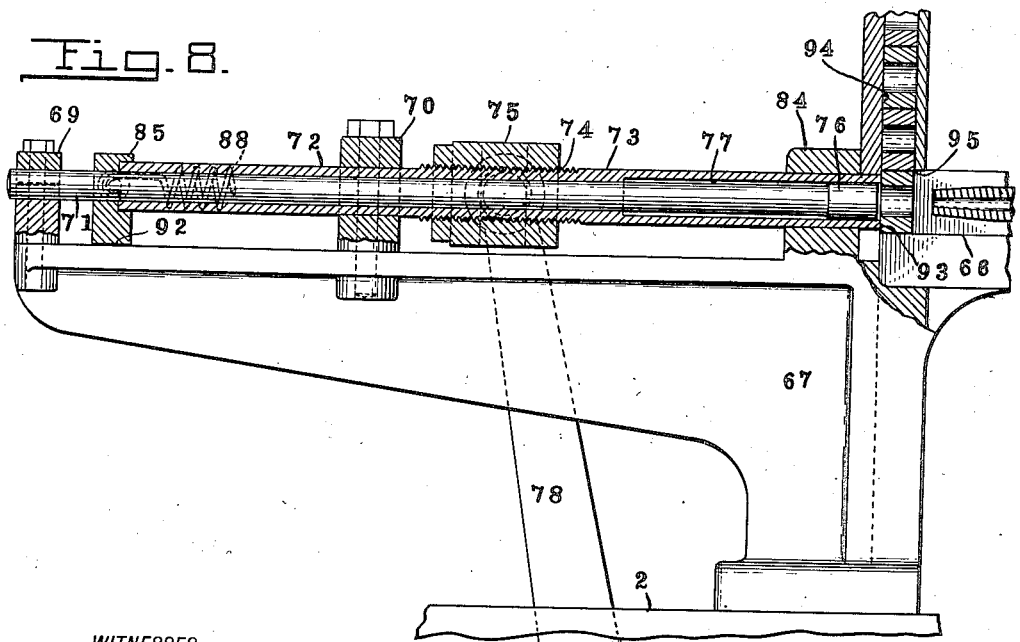

Referring now to the drawings, in which is shown one of various possible embodiments of the invention, Figure 1 is a plan view of an automatic nut tapping machine with the nut hopper and supply chute removed to more clearly set forth the structure below and taken at a time during the operation of said machine when the clutch mechanism has just been thrown into engagement to cause the nut-filled tap to be moved opposite the stripper mechanism. Fig. 2 is a view in front end elevation of said machine but with the hopper and supply mechanism attached. Fig. 3 is a view in rear end elevation of said machine. Fig. 4 is a view in left side elevation of said machine illustrating the position of the parts thereof at that time in the operation when the tap filled with nuts has been presented opposite the stripping mechanism. Fig. 5 is a view in right side elevation of said machine taken at or about the time of tapping the last nut and just prior to the engagement of the clutch mechanism to cause the tap filled with nuts to be rotated into a position opposite the stripper mechanism. Fig. 6 is a view in horizontal central section through the positioning mechanism and the rotary tap-holders or chucks. Fig. 7 is a view in vertical transverse section on the line 7—7 of Fig. 4. Fig. 8 is an enlarged sectional view taken on the line 8—8 of Fig. 1, looking in the direction of the arrows. Fig. 9 is a detail view of the tap-holder in front elevation. Fig. 10 is a longitudinal central sectional view taken on the line 10—10 of Fig. 1. Fig. 11 is a face view of the gripper slide actuating cam and coöperating mechanism. Fig. 12 is a view of the gripper jaw actuating cam and coöperating mechanism.

In the drawings, in which like characters of reference refer to similar parts throughout the several views, the numeral 1 indicates the frame of the machine, the same comprising a table 2 and legs 3, the latter adapted to coöperate with standards 4 which in turn are securely fixed to a platform or to the floor. Supported in suitable adjustable bearing blocks 5 in the standards 4 is a main driving shaft 6 extending the length of the machine and carrying in fixed relation therewith the driving pulley 7 which drives a pulley 8 fixed on a shaft 9 journaled in the frame 1 of the machine; said driving being accomplished through the endless belt 10 which engages said pulley 8 and certain other pulleys supported in suitable brackets disposed on the table 2 of the machine, which will be hereinafter described in detail. The shaft 9 carries a pinion 11 which meshes with a gear 12 fixed on a spindle 13, said spindle having also fixedly mounted thereon a pinion 14 and said spindle being in turn loosely mounted for rotation in the arms 15 and 16 of a swinging bracket 17. The bracket 17 is adjustably mounted on the rear end of the frame 1 (see Fig. 3) and is partially supported by and pivotally arranged on the shaft 9. A slot 18 shaped concentrically to the shaft 9 is provided in said bracket and adapted to engage a stud 19 projecting from the rear end of the frame. A washer 20 and a nut 21 serve to secure the bracket in different adjusted positions on the frame. The before-mentioned arm 16 and another arm 22 have integral therewith at their outer ends a sleeve bearing 23 for a spindle 24; said spindle is adapted to rotate in said bearing and has fixed thereto at one end, meshing with the pinion 14, a gear 25 and carries on its other end in fixed relation therewith and consequently with the gear 25 a sprocket wheel 26 coöperating with a sprocket wheel 27 through the agency of a sprocket chain 28.

By the mechanism just previously described there is provided a train of gearing supported on the movable bracket 17 and driven from the pulley shaft 29. It will be obvious that any movement of the bracket 17 provided for by the stud and slot adjusting means hereinbefore described will be a rotary movement about the shaft 9 and that consequently all the gears and pinions composing the train of gearing will retain their same relative positions. The adjustment may be for the purpose of taking up the slack of the sprocket chain 28 or for other purposes as will be apparent. The sprocket wheel 27 is keyed or otherwise suitably fixed on a shaft 29 at the extreme rear of the machine. There is also provided at the rear of the machine a clutch mechanism 30 comprising a clutch member 31 and a clutch member 32, the latter being loosely mounted on the shaft 29 for rotation thereon independently of the movement of said shaft, and the same being supported in the split bearing 33. The clutch member 32 is provided with a plurality of teeth 34 adapted to engage with corresponding teeth 35 on the clutch member 31, and a sprocket wheel 36 is fixed on the opposite end of said clutch member 32 and is adapted to rotate therewith without being influenced by the rotation of the shaft 29. A feather 37 is provided on the shaft 29 opposite the clutch member 31 and is designed to compel rotary movement of the clutch member 31 with the shaft 29, at the same time permitting sufficient longitudinal movement of said clutch member to engage and disengage with the clutch member 32. The clutch member 31 is provided with an annular groove 38 near its forward end adapted to receive lugs 39 of a forked actuating lever 40 fulcrumed at 41 in the frame and in turn actuated by cam mechanism which will be hereinafter described. An expansile spring 42 surrounds the shaft 29 and has one end abutting a collar 43 adjustably fixed to said shaft. The other end of said spring bears against the forward end of the clutch member 31, tending to throw the latter into engagement with the clutch member 32. On the shaft 29, near the front of the machine, is a worm 44 integral with said shaft and confined in a suitable casing, as indicated at 45. This worm meshes with a worm wheel 46 which in turn is fixed on the cam shaft 47. It will be seen therefore that the cam shaft is driven in the following manner:—The driving shaft 6 through the medium of the pulleys 7 and 8, idler pulleys, and endless belt 10 drives the short shaft 9 journaled in the frame of the machine. This shaft carries the pinion 11 in fixed relation therewith and said pinion drives the shaft or spindle 13 through the agency of the gear 12. The shaft 13 has fixed thereon the pinion 14 which drives the sprocket shaft 24 through the agency of a gear 25 and this sprocket shaft 24 drives the shaft 29 through the sprocket wheel 26, sprocket chain 28 and sprocket wheel 27, and said shaft 29, having integral therewith the worm 44, drives the cam shaft 47 through the medium of the worm wheel 46.

*Nut blanks supplying means.*—Mounted upon the table 2 of the frame 1, and in fixed relation therewith, is a substantial bracket 48 which provides supporting means for a hopper 49, a blank guideway, or chute 50 and a reciprocatory feed member or agitator 51; said agitator is journaled in said bracket at 52, and the same is adapted to be intermittently reciprocated by an arm 53 carrying on its free end a roll 54 adapted to engage with the lower edge of said feeder. This arm 53 is fixed on a shaft 55 which is driven by a shaft 55′ through the medium of the pinion 56 and the gear 57; said shaft 55′ is in turn driven from the shaft 29 by a belt 58 engaging with a pulley 59 on the shaft 55′ and a pulley 60 on the shaft 29. The agitator or feed member 51 is of sector-like shape, having its upper edge channeled as at 61 to receive a plurality of nut blanks in standing edgewise relation therewith. Or, in other words, the channel is not adapted to receive a nut blank except that the same be introduced by its smallest dimension. The hopper 49 is adapted to receive a great number of nut blanks at one time and in the operation of the machine the agitator 51, which is preferably a slicer, is adapted to be intermittently reciprocated about its journal 52 by the mechanism previously described. When the slicer is in its lowermost position the upper edge of the same, or the channel 61, is disposed very near the bottom of the hopper, and in its uppermost position the channel 61 is presented at a considerable angle to the table 2. As the slicer passes up through the hopper it collects a number of nut blanks in the channel 61, and when the same reaches its upper position there is a tendency for the nut blanks to slide from the channel into the chute 50 where they immediately drop into the guide member which will be described later. In this preferred construction the hopper 49 is slotted at the bottom to permit of the reciprocation of the slicer. This slot, however, is always occupied by the slicer, and there is no possibility of the nut blanks falling out of the hopper. There is an opening in the hopper at the mouth thereof, as at 62, to permit the nut blanks to pass into the chute. Disposed slightly above this opening 62 and journaled in the hopper at 63 is a toothed wheel 64 providing means to prevent the mouth of the hopper from becoming choked with nut blanks or any other obstruction. This wheel is so positioned that the nut blanks in their regular path of travel barely clear the teeth of said wheel and in the event that the action of the reciprocatory slicer tends to throw a number of nut blanks other than those disposed in the channel down toward the mouth of the hopper, the teeth of the wheel 64, said teeth moving in a direction opposite that of the direction of the nuts, will serve to keep the passageway clear at the mouth of said hopper. The wheel 64 is rotated from the shaft 29 through the agency of a cross-belt 65 and suitable pulleys.

*Cutting or tapping mechanism.*—The chute 50 discharges at its lower end into a longitudinal guide member 66 so shaped and constructed as to support a nut blank and permit longitudinal movement thereof. This guide member 66 is fashioned in a bracket 67 securely attached to the frame by bolts 68. The bracket 67 carries on the forward end thereof two fixed bearings 69 and 70. The bearing 69 is adapted to support a spindle 71 in fixed relation to the bracket 67, and the bearing 70 has loosely mounted therein a slightly reduced portion 72 of a cylindrical pusher or sleeve 73 which is threaded at 74 to engage a block 75. The spindle 71 is disposed within the cylindrical sleeve 73 and said spindle has a slightly enlarged cylindrical head 76 disposed within a cylindrical recess 77 in the sleeve 73. This recess extends for a considerable distance in the rear portion of the sleeve 73 and terminates, and the interior diameter of the sleeve from the point of termination of said recess to the end of the sleeve is of a size adapted to permit longitudinal movement of the sleeve on the head 76 of the spindle 71. The block 75 is grooved to receive the projecting lugs of a forked actuating follower, comprising a lever 78 pivoted to the frame of the machine on a shaft 79, said shaft having fixed thereon outside the frame a curved arm 80 coacting with certain cams or cam portions 81 and 82 of a cam wheel 83 fixed on the cam shaft 47. The sleeve 73 is slidably supported in the bearings 70 and further slidably supported in an upwardly projecting portion 84 of the bracket 67, and said sleeve 73 connects at its extreme forward end with a yoke 85, said yoke being slidable upon the spindle 71. Hook-shaped arms 86 and 87 are tapped or otherwise suitably secured in the bracket 67 and project rearwardly some distance beyond the guides 66. Contractile springs 88 and 89 each have one end secured respectively to laterally extending portions 90 and 91 of the hook-shaped arms 86 and 87, and have their other ends connecting respectively with opposite sides of the yoke 85, thereby exerting a pressure tending to cause the sleeve 73 to move in a direction toward the rear of the machine. The action of these springs is overcome intermittently by the cam portions 90 on the cam wheel 83 operating to actuate the levers 80 and 78 to move the block 75 and consequently the sleeve 73 in a forward direction. The yoke 85 has a lower face 92 which is adapted to slide on the bracket 67 and said yoke 85, engaging as it does the sleeve member 73 and the spindle 71, serves partially as a support for both of these members. The guide member 66 fashioned in the bracket 67 has a forward wall 93 which coincides with the forward wall 94 of the chute 50, and the sleeve 73 in its retracted position, shown in Fig. 8, has its rear end slightly forward of this wall 93 in order to permit a nut blank to drop from the chute 50 into the guide member 66. The guide member 66, comprises a slot for the passage of the taps between the side walls thereof, and is of such cross-section as to prevent the rotation of the nut blanks when in engagement with the taps. It might be here noted that when the sleeve 73 moves toward the rear it immediately provides a barrier across the open discharging end 95 of the chute 50, thereby preventing any nut blanks from dropping into the guide member 66 until the sleeve has been retracted into the position shown in Fig. 8. The recess 77 in the rear end of the sleeve 73 is for the purpose of allowing penetration of the sleeve by the cutting tool or tap when the sleeve moves toward the rear of the machine in the cutting or tapping operation. This cutting tool or tap will be described in detail in later passages hereof. It will be obvious, however, at this time that if the sleeve 73 surrounds the tap during the cutting or tapping operation, scraps or particles of waste are apt to be disposed therein, and it is for the purpose of ejecting this waste that the slightly enlarged head 76 is provided on the stationary spindle 71. This head substantially corresponds in diameter to the diameter of the recess 77, and when the sleeve 73 is retracted the head 76 serves as a means to eject all waste particles that may be therein. As heretofore stated, the nut blanks pass through the chute 50 and the lowermost nut blank is discharged into the guide 66. The cutting tool or tap is brought into tapping position opposite said lowermost blank or nut by certain positioning means, which will be hereinafter described. The tap is rotated at predetermined times and the cam 83 permits the springs 88 and 89 to move the sleeve 73 rearward over the tap. The end of the sleeve picks up the nut blank which has been discharged into the chute and carries the same on to the threaded end portion of the rotating tap. It is only required to urge the nut blank a short distance onto the tap as the same will be quickly taken by the threads of the tap and being held against rotary movement by the guide 66, the threads of the tap will cause the same to move in a longitudinal direction until the nut blank has passed entirely over the threaded portion of the tap on to the shank portion thereof. As each of the cams or cam portions 81 of the cam-wheel 83 coacts with the lever 80 to move the latter on to a high portion of the cam, the sleeve 73 is retracted against the action of the springs 88 and 89 and immediately the end of said sleeve recedes past the opening at the delivery end of the chute 50, the lowermost nut blank when in the chute will be discharged into the guide member 66.

It will be noted that the low portions of the cam 83 operate to permit the springs 88 and 89 to feed the blanks into engagement with the tap for the tapping of the nuts, while the high portions, which in this preferred form of the invention very much resemble gear teeth, provide for retracting the sleeve or carrier 73 into a position to feed another nut blank. It will be further noted that dwell portions are also provided on the cam-wheel, the dwell 82' on the low portion of the cam being for the purpose of allowing sufficient time for a nut blank which may be disposed on the tap to pass entirely over said tap on to the shank thereof, and the dwell 81' on the high portion of the cam being for the purpose of allowing sufficient time for the tap to be moved out of tapping position and another tap to be moved into tapping position.

*The tap-holder.*—This mechanism, illustrated in enlarged section in Fig. 6 of the drawings, comprises rotatable members 96 adapted to hold the taps, preferably by gripping the same, and as they are similar in construction, a description of one will suffice for all. Each of the rotatable members 96 is provided with a head 97 and a spindle 98, said spindle being in turn mounted in a tap translatory means, preferably a rotatable turret 99, to be hereinafter further described. The immediate holding means for a tap comprises a set of gripper jaws pivoted on the head 97, said set in the preferred form comprising oppositely disposed jaws 100 and 101 pivoted at 102 and 103, on said head, each jaw providing an angular tap contacting piece or bit 104, held by a screw-bolt 105. These jaws are pressed apart by springs 106 disposed in recesses 107, in said jaws, and are positively pressed toward each other to grip the tap by rock levers 108 and 109 pivoted to the head 97 at 110 and 111, the outer arms of which levers are provided with adjustable members 112 adapted to contact the heads of the bolts 105, the members 112 being threaded through openings in said arms and held therein by locking-screws 113. The rock levers 108 and 109 are disposed in recesses 114 in the head 97, and are coupled to a block 115, slidably mounted in guides 116 in the head 97, by toggle links 117. The block 115 is carried by a rod 118 extending through the spindle 98, and normally projecting a distance to the rear of said spindle. An abutment member 118' of tooled steel or other suitable material is disposed in the holder 96 opposite the proximate end of the tap. The spindle 98 is longitudinally cored to receive the actuating rod 118 of the gripper mechanism and surrounding said rod and engaging a cup-shaped washer 119 is a substantially strong expansile coil spring 120. The forward end of said spring bears against the washer 119 which in turn abuts the end 121 of the core of the spindle 98, and the rear end of said spring bears against a cylindrical head 122 tapped or otherwise suitably adjustably secured on the rear end of the rod 108, said head 122 being adapted for longitudinal movement in a cylindrical bushing 123 tightly fitted in the core of the spindle 98. Suitable exterior bearings are provided for said spindle, as indicated at 124 and 125, to facilitate a free rotary movement of the spindle 98 in the turret 99, and said turret is adapted in this preferred form of the invention to support a plurality, preferably two, of these tap-holders, diametrically disposed relatively to the axis of the turret and at a distance from, or concentric to, said axis. A pulley 126 is keyed or otherwise suitably secured on each spindle and adapted to rotate the same. Anti-frictional thrust bearings 127 are provided for purposes which will be obvious and need not be explained. A rock lever 128 is pivoted on the frame of the machine at 129 and has a curved bearing face 130 which is adapted to contact with the projecting end 131 of the actuating rod 118, and it may here be noted that the spring 120 operates to normally urge this rod in a rearward direction. This will cause the toggle links 117 to straighten, tending to throw the rear end of the rock levers outward from the axis of the tap-holder and to bring the gripper jaws into gripping position against the tap, overcoming the action of the springs 106. At a certain time in the operation of this machine, to wit, during the blank discharging operation, it is designed to release the tap from its engagement with its holder and to accomplish this is the important function of the lever 128. Accordingly, there is provided on the cam shaft 47 a cam 132 which coacts with a cam roll 133 supported on an arm 134 pivoted on the frame 1 at 135. This arm 134 is connected to the lower end of the rock lever 128 through the connecting rod 136. This rod is in two portions and a turn buckle 137 is provided for purposes of connection and adjustment. The cam 132 is adapted at a predetermined time to actuate the rock lever 128 to move the upper end thereof forwardly carrying the actuating rod 118. This movement overcomes the action of the spring 120 and permits the springs 106 to throw apart the gripper jaws of the rotary tap-holders, as illustrated in Fig. 6 (upper tap-holder). Other tap-holding mechanism comprising a set of gripper jaws coöperating with the discharging or stripping device, hereinafter referred to, may then advance, grip the tap and withdraw the same from the holder, bringing said tap into a position to be discharged of blanks, substantially as indicated by the dotted lines at 138, Fig. 6. When the discharging operation is completed the last mentioned gripping devices return the tap to its former position in the holder, and at that time the cam roll 133 rides off the high portion of the cam 132, allowing the spring 120 to move the rock levers 109 into their normal active position against the jaws 100 and 101, thereby overcoming the action of the springs 106 and causing reëngagement of the cutting tool or tap.

*The positioning, or tool translating, mechanism.*—Comprises means to translate the cutting tools or taps to different positions and means are also provided to lock the translatory means in said different positions. As has been heretofore stated, the taps 139 are removably fixed in rotatable members 96, said members having spindles 98 supported in a movable turret 99. In the preferred form of the machine, the member 99 is in the nature of a rotary turret comprising a front cylindrical portion 140 and a rear cylindrical portion 141, the same being connected together by ties 142. These portions 140 and 141 have rotary bearings in a bracket 143, said bracket being adjustably secured to the table 2 of the frame 1 in ways 144 provided on said table to permit longitudinal movement of the bracket 143 and the entire mechanism supported thereby. This bracket is split at 145 to facilitate the assembling of parts. Secured to the rear face of the rear cylindrical member 141 of the turret is a locking ring 146, and secured to the latter is a gear 147. The locking ring is provided with diametrically disposed notches 148 and 149 and in the normal operative condition of the machine said turret is locked against rotary movement by a latch 150. This latch 150 comprises a pivoted arm 151 pivoted to the bracket 143 at 152 and having a projection or tooth 153 adapted to fit in either of the notches 148 or 149. The pivoted arm 151 has formed on the lower side thereof a fork straddling the upper end of a connecting link 154 which is pivoted thereto, as indicated at 155. The lower end of the connecting link 154 is in turn straddled by the forked end 156 of an arm 157 of a bell crank lever 158, the other arm 159 of which connects through a connecting rod 160 with an arm 161 of another bell crank lever 162. The other arm 163 of the lever 162 has a lug 164 adapted to coact with a cam 165 fixed to the cam shaft 47. By the mechanism just previously described, the latch 150 is adapted to be thrown in and out of engaging relation with the locking ring 148 as when the lug 163 rides up on the high portion 166 of the cam 165, the arm 159 of the bell crank lever 158 is moved toward the front of the machine. The arm 157 of said lever is accordingly moved down carrying the connecting link 154 and accordingly retracting the projection 153 from its engagement with the locking ring. The lug 164 is only thrown outward on to the high portion of the cam 165 during a short angular travel of the cam, and as soon as the high portion 166 has passed by said lug 164 in the course of travel of the former the leaf spring 167 (shown in the dotted lines in Fig. 3) tends to return the mechanism to its normal locking position. It so happens in this embodiment that when the high portion 166 of the cam 165 rides past the lug 164 and the spring 167 operates to return the parts to their normal locking position neither of the notches 148 or 149 are in a position to receive the projection 153 of the latch, as this occurs at a time in the operation of the machine when the turret is turning 180 degrees. Accordingly the projection 153 bears against the periphery of the locking ring waiting its opportunity to engage one of the notches 148 or 149 and when the proper one of these notches is presented opposite the latch the same immediately engages therewith, stops the turret and securely holds the same against any further rotary movement in either direction until a second operation of the unlocking mechanism. The turning of the turret is accomplished in the following manner: The gear 147 meshes with a pinion 168 fixed on a short shaft 169 supported in a bearing bracket 170 on the table 2 of the frame 1. This shaft is yieldingly, preferably, frictionally connected by means of two friction plates 171 and 172 to a sprocket wheel 173 and said sprocket wheel is in turn connected to the sprocket wheel 36 (heretofore described) by a sprocket chain 174. A cam 175 on the cam shaft 47 coöperates with an arm 176 fulcrumed on a stud 177 on which is also pivoted the bell crank lever 162. This arm 176 connects with the lower end of the forked actuating lever 40 through a connecting rod 178, and said cam 175 is adapted to maintain the clutch mechanism 30 in open position except for a short angular travel of the cam during which time it allows the spring 42 to urge the clutch member 31 into engagement with the clutch member 32. This happens at a time in the operation of the machine just subsequent to the filling of one tap shank with a predetermined number of nuts which it is desired to strip therefrom, and the engagement of the clutch mechanism imparts the rotary movement of the shaft 29, which is continuously rotated, to the short shaft 169 through the sprocket 34, sprocket chain 174, sprocket 173 and friction plates 171 and 172, causing a rotation of the pinion 168 during the engagement of the clutch mechanism 30 and the disengagement of the latch 150 from the locking ring 146. As soon as one of the diametrically opposed notches 148 or 149 is presented opposite the latch the spring 167 causes immediate engagement of said latch with one of said notches and even though the clutch members 31 and 32 may not have become wholly disengaged the turret will stop rotating for the reason that the connection between the sprocket 173 and the shaft 169 is a frictional connection and slipping will occur between the plates 171 and 172 and the sprocket 173.

From the above just described construction it will be noted that the turret 99 supports and translates a plurality of sets of tap gripper jaws which have an intermittent movement in an endless path to different positions, primarily positions where the blanks are tapped and where the blanks are discharged from the taps, each tap being connected to its holder so that the two rotate as one.

*Auxiliary tap-holding means.*—As a result of the tapping operation in the present embodiment, the tapped blanks will be found strung upon the shank of the tap between its head and the threaded or cutting portion of the tap, and the present invention provides coöperating means for discharging or stripping said blanks from the taps. To this end automatic mechanism is provided for removing the ends of the taps from the holding gripper jaws hereinbefore referred to and pushing the blanks off the tap. On the table 2, adjacent one of the stationary positions in the rotary path of the taps, is a guideway 180 in which is adapted to reciprocate a tap supporting carriage 181. Said carriage has an accurate fit in the guideway and forms a support for an auxiliary set of gripper jaws for the taps. In the present embodiment the gripper jaws comprise oppositely disposed angular tap contacting members or bits 182 adjustably fixed by means of screw-bolts 183 in rock levers 184 pivoted at the upper portion of the carriage at 185.

186 represents a rock shaft journaled in the carriage and provided with a cross-head 187, and links 188 connect the lower ends of the levers 184, respectively, with the opposite ends of said cross-head. Fixed to the shaft 186 is a sleeve 189, having parallel arms 190 and 191, and a pivot pin 192 connects the outer ends of said latter arms. A square block 193, journaled on the pin 192, is encircled by a square strap 194, and said block is adapted for slight longitudinal movement in ways provided by said strap. The strap has a depending elongated stem 195 provided at its lower end with an adjustable collar 196. Surrounding the stem 195 is a cylindrical sleeve 197, the upper portion of which is adapted to abut a shoulder 198 of the strap 194. Surrounding the stem 195, within the sleeve 197, is a helical spring 199, the upper end of which is adapted to lie against an inner shoulder on the sleeve 197 and the lower end of which is adapted to contact the collar 196. The lower portion of the sleeve 197 is provided with bearings for one arm of a bell-crank lever 200, pivotally mounted on the frame at 201, the other arm of said lever having a cam roll 202 which is adapted to travel in a face cam 203 on the cam shaft 47. The cam 203 is so shaped as to raise and lower the sleeve 197 and thereby open and close the auxiliary gripper jaws 182 at proper predetermined times, and it will be observed that the movement tending to close said jaws is accomplished through the instrumentality of the spring 199, said gripper jaws being resiliently closed as distinguished from a positive closing thereof. By this construction, should there be an improper positioning of the tap in the gripper jaws or foreign matter becomes disposed therebetween, fracture of the more delicate parts of the mechanism will be avoided. The carriage 181 is adapted to move toward and from that tap in the turret which has been brought to discharging position, and in order to accomplish these movements, the bottom of said carriage is pivotally connected to a lever 204 pivoted at the lower end of a depending bracket 205 and provided with a cam roll 206 coöperatively associated with a cam on the shaft 47 to give reciprocatory motion to the carriage 182 at proper times. In this connection it may be noted that the cam is so shaped as to cause the carriage 181 to move the auxiliary grippers into position opposite the tap, while the latter is gripped in the turret, to then draw said tap from the turret, to then hold said tap stationary while the blanks are being discharged therefrom and to then restore said tap to the turret grippers. It may be further noted that in fixing the taps in the tap-holders of the turret they will be set in the position to run true, and the angular heads of the taps provide for a variety of rotative positions thereof in the turret tap-holders. Having been set in true running position for tapping, it is designed that the same true position shall always be occupied by the particular tap during the tapping operation, and to this end the taps will be returned to the turret grippers and to the original rotative position relative to the latter grippers after the discharge of blanks therefrom. The tap to be discharged being in position in the turret grippers, the carriage 181 advances and the grippers 182 close upon the tap at a point remote from its head, preferably opposite the threaded channeled portion thereof, for which the angular character of the jaws 182 is especially adapted. The jaws 182 then close upon the tap, effectively gripping the same before the turret gripper jaws release the tap. The latter jaws then release their grip upon the shank of the tap, and the auxiliary gripper jaws retreat, carrying with them the tap, and spacing the shank end of the tap from the other gripping mechanism so as to provide for the free escape of the blanks from the shank of the tap as will hereinafter appear.

*Tap discharging mechanism.*—The tap to be discharged having been spaced as described, the present embodiment provides a discharging device, abutment, or plate which is adapted to contact with the blanks, and upon relative longitudinal movement of the discharging device and said tap, the blanks will be discharged. The numeral 210 indicates an abutment or plate which is adapted to contact the foremost of the blanks upon the tap and positively discharge them therefrom. This plate is preferably provided with an opening 211 of insufficient size to escape the blanks but adapted to freely encircle the tap, and said plate is carried by a block 212, having reciprocatory movement and being guided on a squared guide bar 213, fixed in a bracket 214 on the table 2. The block 212 is made in separable parts for convenient application to the bar 213 and a link 215 connects said block to an upper arm of a rock lever 216 pivoted to the frame at 217 and having an arm 218 provided with a weight 219, the organization being such that the weight 219 tends to move the block and the discharging plate carried thereby in a direction to push the blanks off of the tap. Inasmuch as, in the present embodiment, the discharging plate 210 encircles the tap, means are provided for moving said plate with the auxiliary gripper jaws when the latter advance to grip the tap and recede therewith, and also to move said plate into its normal initial position after the blanks have been discharged. To this end the lever 216 is provided with an arm 220, to which is pivotally connected a supporting member 221, having a slotted engagement with a squared block 222, journaled on the cam shaft 47, there being a cam roll 223 on the member 221 which contacts with a cam 224 on the shaft 47, the latter cam being designed to positively give certain proper movements to the discharging plate 210.

In the operation of this machine the nut blanks are shoveled into the hopper and are intermittently disturbed by the agitating mechanism and fed into the chute thereby. As a single nut blank is discharged into the guide member the cam wheel 83 is so timed as to permit the carrier or sleeve to be moved rearwardly under the action of its springs. This carrier picks up the nut which has been discharged into the guide member and carries the same onto the end of the tap which is then rotating by virtue of the engagement of the pulley 126 with the continuously driven belt 10. The guide member holds the nut blank against rotary movement during its longitudinal travel over the threaded head of the tap, and the tap itself, by virtue of its helical threads and rotary movement causes the nut to be wormed over onto the threaded portion thereof on to the smooth shank portion. The machine is adapted to tap a predetermined number of nut blanks according to the number of teeth 81 provided on the cam 83, and when this number of nut blanks has been presented to the tap by the carrier a dwell occurs in the cam allowing sufficient time for the tap coacting with the guide member 66 to worm the last nut over the threaded portion of the tap. A dwell occurs here on the high portion 82 of the cam for a purpose which has been heretofore described. At this time in the operation of the machine the cam 165 operates to unlock the turret in the manner which has been hereinbefore described in detail, and simultaneously the cam 165 operates to throw the clutch mechanism 30 into engagement and rotate the turret 180 degrees. Two taps are provided in this preferred form of the invention, but it will be obvious that a greater number might be used, and those taps which were not in tapping operation or stripping would merely remain idle until presented opposite one or the other of these mechanisms. When the turret has been rotated 180 degrees, it is locked in position by the latch 150, the positions of the taps, as shown in Fig. 1, are reversed and the tap having the predetermined number of nuts threaded thereon is presented opposite the stripper or discharging mechanism at the same time that the clear tap is presented opposite the nut carrier. It is to be further noted, and the same will be readily seen upon reference to Figs. 2 or 3 of the drawings, that when the turret has been rotated, say 90 degrees, both tap pulleys 126 are in contact with the belt 10 and accordingly both rotate at this time. As the turret moves from this position to the 180-degree position, it will be seen that the pulley 126 of the tap holder of the tap which has just been in the threading operation is free and clear of any influence from the belt 10. A brake shoe 225 is fixed to the bracket 143 and adapted to bear against the pulley 126 when the pulley is opposite the discharging mechanism for the purpose of immediately stopping the rotation of said pulley. Therefore when one tap is rotated opposite the carrier 73, the other tap is held without rotation opposite the discharging mechanism.

Having reached that point in the operation of the machine where the nuts have been threaded on to the tap, the turret has been unlocked and rotated 180 degrees bringing the tap with the threaded nuts thereon opposite the discharging mechanism. The auxiliary set of gripper jaws advances to the tap with its gripper jaws in open position until the latter are disposed opposite the threaded end of the tap. The auxiliary gripper jaws are then closed by means of face cam 203 coacting with the cam roll 206 and then the actuating lever 128 is moved forwardly by the cam 132 to cause the gripper jaws 100 and 101 to be opened. The block 212 carrying the discharging plate 210 is advanced simultaneously with the advancement of the tap supporting carriage 181, but does no discharging at this time, and as the auxiliary holder retreats with its gripper jaws firmly engaging the threaded head of the tap, withdrawing the same from the turret gripper jaws, the block 212 carrying the discharging plate 213 also retreats. As soon as the turret has been locked in position presenting the clear tap opposite the blank feeder, the tapping of nut blanks recommences and continues during the discharging operation. The auxiliary tap holder having been returned to its normal position the discharging plate 210 now advances alone and urges the threaded nuts over the shank end of the tap from whence they drop through an aperture 227 in the table 2 and out of the machine. The plate 210 dwells for a period of time at the end of its discharging movement and during this dwell the auxiliary tap holder advances carrying the tap back into the identical position in the set of turret grippers from which it was withdrawn. The cam 132 at this time permits the spring 120 to move the actuating rod 118 back to its normal position closing the gripper jaws 100 and 101 on to the tap. The auxiliary gripper jaws are then thrown open releasing the threaded end of the tap, and the auxiliary holder and the stripper plate 210 then retreat together to their initial positions and the auxiliary gripper jaws are opened to receive the threaded end of the next tap. The time taken for the purpose of discharging substantially corresponds in this preferred form of the invention to the time taken to tap the predetermined number of nuts and accordingly at the end of the discharging operation the opposite tap is provided with its proper number of threaded nuts and the clutch 30 is again engaged and the turret rotated 180 degrees completing the cycle and bringing the first tap again opposite the nut blank feeder or carrier. Accordingly there are provided by the construction described a machine adapted to practically continuously tap nut blanks, the only delay being the time taken to revolve the turret 180 degrees and it will readily be seen that even this time need not be taken as the invention contemplates the use of a greater number of taps disposed in the turret, say apart from each other at an angle of 90 degrees, and in this event it will only be necessary to rotate the turret 90 degrees taking half as much time. There is also provided by this invention means to return the tap to its exact primary position in the rotary tap holder of the turret, it often being necessary to use a great degree of care in alining the tap with the guides and carrier. The advantage of this machine over prior machines which are not equipped with means to restore the tap to its initial position in the holder will readily be seen.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described, and all statements of the scope of the invention which, as a matter of language, might be said to fall therebetween.

Having described our invention, what we claim as new and desire to secure by Letters Patent is:

1. In an apparatus of the character described, in combination, tapping means comprising a plurality of taps, and means adapted to hold one of said taps and discharge the same while another of said taps coöperates to tap a blank, said tapping means comprising mechanism adapted to effect a relative movement between a tap and a blank to thread the blank.

2. In an apparatus of the character described, in combination, tapping means comprising a plurality of taps, means adapted to intermittently translate said taps to tapping position, and means adapted to discharge one of said taps while another of said taps coöperates to tap a blank, said tapping means comprising mechanism adapted to effect a relative movement between a tap and a blank to thread the blank.

3. In an apparatus of the character described, in combination, tapping means comprising a plurality of taps, means adapted to intermittently translate said taps to tapping position, and means adapted to hold and discharge one of said taps while another of said taps coöperates to tap a blank, said tapping means comprising mechanism adapted to effect a relative movement between a tap and a blank to thread the blank.

4. In an apparatus of the character described, in combination, tapping means comprising a plurality of taps, means adapted to intermittently translate said taps to tapping position, and means adapted to contact a blank and discharge a blank at a position of rest while another of said taps coöperates to tap a blank, said tapping means comprising mechanism adapted to effect a relative movement between a tap and a blank to thread the blank.

5. In an apparatus of the character described, in combination, tapping means comprising a plurality of taps, and means whereby one of said taps is gripped and discharged while another of said taps coöperates to tap a blank.

6. In an apparatus of the character described, in combination, tapping means comprising a plurality of taps, and means whereby one of said taps is discharged of a plurality of blanks while another of said taps coöperates to tap one or more blanks.

7. In an apparatus of the character described, in combination, tapping means comprising a plurality of taps, means adapted to intermittently translate said taps to different positions of rest, and means whereby one of said taps is discharged of a plurality of blanks while another of said taps coöperates to tap one or more blanks.

8. In an apparatus of the character described, in combination, tapping means comprising a plurality of taps, and means whereby one of said taps is held and discharged of a plurality of blanks while another of said taps coöperates to tap one or more blanks.

9. In an apparatus of the character described, in combination, tapping means comprising a plurality of taps, means adapted to rotate said taps at a predetermined time, blank-discharging means, means whereby one of said taps while revolving coöperates to tap blanks while another of said taps is discharged of blanks, and means adapted to resist rotary movement of said last-mentioned tap while being discharged of blanks.

10. In an apparatus of the character described, in combination, tapping means comprising a plurality of taps, means adapted to translate said taps to different positions, blank-discharging means, and means whereby one of said taps when in one of said positions coöperates to tap a plurality of blanks while another of said taps is discharged of blanks.

11. In an apparatus of the character described, in combination, tapping means comprising a plurality of taps, means adapted to translate said taps to different positions, blank-discharging means, means whereby one of said taps when in one of said positions coöperates to tap blanks while another of said taps is discharged of blanks, and means adapted to lock said translatory means in said different positions.

12. In an apparatus of the character described, in combination, tapping means comprising a plurality of taps, means whereby one of said taps coöperates to tap blanks while another of said taps is discharged of blanks, a blank-discharging device, means adapted to cause relative movement of said device and the tap to be discharged of blanks, and means adapted to support the latter tap at a point remote from its head during the discharge of blanks.

13. In an apparatus of the character described, in combination, tapping means comprising a plurality of taps, a plurality of sets of tap gripper jaws, one set for each tap, means whereby one of said taps coöperates to tap blanks while another of said taps is discharged of blanks, a blank-discharging device, means adapted to cause relative movement of said latter device and the tap to be discharged of blanks, and means adapted to support the latter tap at a point remote from its head during the discharge of blanks comprising a set of tap gripper jaws movable toward and from said first-mentioned sets.

14. In an apparatus of the character described, in combination, tapping means comprising a plurality of taps, a plurality of sets of tap gripper jaws, one set for each tap, means whereby one of said taps coöperates to tap blanks while another of said taps is discharged of blanks, a blank-discharging device, means adapted to cause relative movement of said latter device and the tap to be discharged of blanks, means adapted to support the latter tap at a point remote from its head during the discharge of blanks comprising a set of tap gripper jaws movable toward and from said first-mentioned sets, and means adapted to independently open and close said gripper jaws.

15. In an apparatus of the character described, in combination, tapping means comprising a plurality of taps, a plurality of sets of tap gripper jaws, a set for each tap, means adapted to intermittently move said sets of jaws in an endless path, means whereby one of said taps coöperates to tap blanks while another of said taps is discharged of blanks, a blank-discharging device, a member adapted to reciprocate toward and from the path of said sets of jaws, a set of tap gripper jaws carried by said member, means adapted to cause said last-mentioned set of jaws to grip the tap to be discharged of blanks, means adapted to cause the gripper jaws of said first-mentioned sets to release said latter tap, and means adapted to cause relative movement of said discharging device and said last-mentioned tap to effect discharge of blanks.

16. In an apparatus of the character described, in combination, tapping means comprising a plurality of taps, a plurality of sets of tap gripper jaws, a set for each tap, means adapted to intermittently move said sets of jaws in an endless path, means whereby one of said taps coöperates to tap blanks while another of said taps is discharged of blanks, a blank-discharging device, a member adapted to reciprocate toward and from the path of said sets of jaws, a set of tap gripper jaws carried by said member, means adapted to cause a set of said first-mentioned sets of jaws to release the tap to be discharged of blanks, means adapted to cause said reciprocatory jaws to grip said latter tap before said release, and means adapted to cause relative movement of said discharging device and said latter tap to effect discharge of blanks.

17. In an apparatus of the character described, in combination, tapping means comprising a plurality of taps, a plurality of sets of tap gripper jaws, a set for each tap, means adapted to intermittently move said sets of jaws in an endless path, means whereby one of said taps coöperates to tap blanks while another of said taps is discharged of blanks, a blank-discharging device, a member adapted to reciprocate toward and from the path of said sets of jaws, a set of tap gripper jaws carried by said member, means adapted to cause a set of said first-mentioned sets of jaws to release the tap to be discharged of blanks, means adapted to cause said reciprocatory jaws to grip said latter tap before said release, means adapted to cause said reciprocatory jaws to move and thereby space the head end of the tap carried thereby from said other set of jaws, and means adapted to cause relative movement of said discharging device and said latter tap to effect discharge of blanks.

18. In an apparatus of the character described, in combination, tapping means comprising a plurality of taps, a plurality of sets of tap gripper jaws, a set for each tap, means adapted to intermittently move said sets of jaws in an endless path, means whereby one of said taps coöperates to tap blanks while another of said taps is discharged of blanks, a blank-discharging device comprising a blank moving element, a guide therefor, and means adapted to move said element relative to said tap to be discharged of blanks.

19. In an apparatus of the character described, in combination, tapping means comprising a plurality of taps, a plurality of sets of tap gripper jaws, a set for each tap, means adapted to intermittently move said sets of jaws in an endless path, means whereby one of said taps coöperates to tap blanks while another of said taps is discharged of blanks, a blank-discharging device comprising a blank moving element, a guide therefor, yielding means adapted to move said element in a direction to effect discharge of blanks, and means to positively move said element in the opposite direction.

20. In an apparatus of the character described, in combination, tapping means comprising a plurality of taps, a plurality of sets of tap gripper jaws, a set for each tap, means adapted to intermittently move said sets of jaws in an endless path, means whereby one of said taps coöperates to tap blanks while another of said taps is discharged of blanks, a blank-discharging device, means adapted to cause relative movement of said device and the tap to be discharged of blanks, resilient means adapted to cause said jaws to grip said taps, and means adapted to positively release said jaws.

21. In an apparatus of the character described, in combination, tapping means comprising a plurality of taps, a plurality of sets of gripper jaws, a set for each tap, means adapted to intermittently move said sets of jaws in an endless path, means whereby one of said taps coöperates to tap blanks while another of said taps is discharged of blanks, a blank-discharging device comprising a reciprocatory blank moving element opposite a point of rest in said path, a tap reciprocatory carrier comprising a set of tap gripper jaws opposite said point of rest, and means adapted to cause the tap at said point of rest to be released by the first-mentioned set of jaws, gripped by the carrier jaws, moved and spaced from said first jaws, and the blanks disposed in the path of said discharging device.

22. In an apparatus of the character described, in combination, a tap, a rotary tap-holder, means adapted to connect said tap and holder so as to cause them to rotate as one, means adapted to disconnect said tap from said holder, and means adapted to restore said tap to its original position in said holder.

23. In an apparatus of the character described, in combination, a tap, a rotary tap holder, means adapted to connect said tap and holder so as to cause them to rotate as one, means adapted to cause relative movement of said tap and holder longitudinally of said tap, and means adapted to restore said tap to its original position in said holder.

24. In an apparatus of the character described, in combination, a tap, a rotary tap holder, means adapted to connect said tap and holder so as to cause them to rotate as one, means adapted to translate said holder, means adapted to thereafter disconnect said tap from said holder, and means adapted to restore said tap to its original position in said holder.

25. In an apparatus of the character described, in combination, a tap, a rotary tap holder, means adapted to connect said tap and holder so as to cause them to rotate as one, means adapted to rotate said holder, means adapted to disconnect said tap from said holder, means adapted to restore said tap to its original position in said holder, and means adapted to bring said holder to rest relative to rotary motion before said tap is disconnected therefrom.

26. In an apparatus of the character described, in combination, a rotary tap holder comprising gripper jaws, a tap held by said jaws against rotation relative to said jaws, means adapted to rotate said jaws, means adapted to cause said jaws to grip and release said tap, means adapted to move said tap relatively to said jaws longitudinally of the tap when the tap is released, and means adapted to restore said tap to its original relatively rotary position in said jaws.

27. In an apparatus of the character described, in combination, a rotary tap holder comprising angular gripper jaws, a tap having an angular head held by said jaws against rotation relative to said jaws, means adapted to rotate said jaws, means adapted to cause said jaws to grip and release said tap, means adapted to move said tap relatively to said jaws longitudinally of the tap when the tap is released, and means adapted to restore said tap to its original relatively rotary position in said jaws.

28. In an apparatus of the character described, in combination, a tap, a rotary tap holder, means adapted to connect said tap and holder so as to cause them to rotate as one, means adapted to cause said tap to tap blanks, means adapted to disconnect said tap from said holder after the tapping operation, means adapted to restore said tap to its original position in said holder, and means adapted to discharge said tap of blanks after said tap is disconnected from said holder.

29. In an apparatus of the character described, in combination, a rotary tap holder comprising a set of gripper jaws, a tap held by said jaws against rotation relative to said jaws, means adapted to rotate said jaws to effect tapping of blanks, means adapted to cause said jaws to grip and release said tap, a second set of gripper jaws, means adapted to cause said second set of jaws to grip said tap and move the same relative to said first set longitudinally of said tap when said tap is released by said first jaws, means adapted to discharge said tap of blanks while held by said second set of jaws, and means adapted to cause said second set of jaws to restore said tap to its original position in the first set of jaws.

30. In an apparatus of the character described, in combination, a rotary tap holder comprising a set of gripper jaws, a tap held by said jaws against rotation relative to said jaws, means adapted to rotate said jaws to effect tapping of blanks, means adapted to cause said jaws to grip and release said tap, a non-rotatable set of gripper jaws, means adapted to cause said non-rotatable set of jaws to grip said tap and move the same relative to said first set longitudinally of said tap when said tap is released by said first jaws, means adapted to discharge said tap of blanks while held by said non-rotatable set of jaws, and means adapted to cause said non-rotatable set of jaws to restore said tap to its original position in the first set of jaws.

31. In an apparatus of the character described, in combination, a tap, means adapted to cause said tap to tap a predetermined number of blanks, means adapted to move said tap from tapping position, and means comprising a blank contacting member adapted to have a relative movement with said tap to discharge said tap of blanks while out of said tapping position.

32. In an apparatus of the character described, in combination, a rotatable tap, means adapted to cause said tap to rotate to effect tapping of blanks, means adapted to feed blanks to said tap, means adapted to move said tap out of tapping position after a predetermined number of blanks has been tapped thereby, and means comprising a blank contacting member adapted to have relative movement with said tap to discharge said tap of blanks while out of said tapping position.

33. In an apparatus of the character described, in combination, tapping means comprising a plurality of rotary taps and tap holders, means adapted to connect said taps to said holders, respectively, so as to cause each tap and its associated holder to rotate as one, blank-discharging means, means adapted to disconnect one of said taps from its holder, means whereby said disconnected tap is discharged of blanks while another of said taps coöperates to tap blanks, and means adapted to restore said discharged tap to its original position in said holder.

34. In an apparatus of the character described, in combination, a tap, a rotary tap holder, means adapted to connect said tap and holder so as to cause them to rotate as one, means adapted to move said tap into and out of tapping position, means adapted to cause said tap to tap a predetermined number of blanks when in tapping position, means adapted to disconnect said tap from said holder when out of tapping position, and means adapted to restore said tap to its original position in said holder.

35. In an apparatus of the character described, in combination, tapping means comprising a plurality of taps, blank-discharging means, means whereby one of said taps coöperates to tap a predetermined plurality of blanks while in tapping position, means to move said taps into and out of tapping position, and means whereby another of said taps is discharged of blanks while said other tap is tapping blanks.

36. In an apparatus of the character described, in combination, a tap, a rotary tap holder, means adapted to connect said tap and holder so as to cause them to rotate as one, means adapted to move said tap into and out of tapping position, means adapted to cause said tap to tap a predetermined number of blanks when in tapping position, means adapted to disconnect said tap from said holder when out of tapping position, means adapted to discharge said tap of blanks when disconnected, and means adapted to restore said tap to its original position in said holder.

37. In an apparatus of the character described, in combination, a rotatable mandrel, a plurality of taps rotatably mounted thereon, means adapted to rotate said taps, means adapted to intermittently rotate said mandrel and thereby dispose one of said taps in blank tapping position and another in blank-discharging position, means adapted to feed blanks into engagement with said tap in tapping position, and means adapted to discharge blanks from the tap in discharging position simultaneously with the feed of blanks to the tap in tapping position.

38. In an apparatus of the character described, in combination, a rotatable mandrel, a plurality of taps rotatably mounted thereon, means adapted to rotate said taps, means adapted to intermittently rotate said mandrel and thereby dispose one of said taps in blank-tapping position and another in blank-discharging position, means adapted to feed blanks into engagement with said tap in tapping position comprising a guideway for blanks, a pusher, means adapted to cause said pusher to move successive blanks into engagement with the tap in tapping position, and means adapted to discharge blanks from the tap in discharging position simultaneously with the feed of blanks to the tap in tapping position.

39. In an apparatus of the character described, in combination, a rotatable mandrel, a plurality of taps rotatably mounted thereon, means adapted to rotate said taps, means adapted to intermittently rotate said mandrel and thereby dispose one of said taps in blank-tapping position and another in blank-discharging position, means adapted to feed blanks into engagement with said tap in tapping position, comprising a guideway for blanks, a pusher, and means adapted to cause said pusher to move a successive predetermined number of blanks into tapping engagement with each tap when in tapping position, and means adapted to discharge blanks from the tap in discharging position simultaneously with the feed of blanks to the tap in tapping position.

40. In an apparatus of the character described, in combination, a rotatable mandrel, a plurality of taps rotatably mounted thereon, means adapted to rotate said taps, means adapted to intermittently rotate said mandrel and thereby dispose one of said taps in blank-tapping position and another in blank-discharging position, means adapted to feed blanks into engagement with said tap in tapping position, comprising a guideway for blanks, a reciprocatory pusher, a rotary element comprising a predetermined number of cams, a follower adapted to contact with said surfaces and connected to said pusher, and means adapted to discharge blanks from the tap in discharging position simultaneously with the feed of blanks to the tap in tapping position.

41. In an apparatus of the character described, in combination, a rotatable mandrel, a plurality of taps rotatably mounted thereon, means adapted to rotate said taps, means adapted to intermittently rotate said mandrel and thereby disposed one of said taps in blank-tapping position and another in blank-discharging position, means adapted to feed blanks into engagement with said tap in tapping position comprising a guideway for blanks, a reciprocatory pusher, a rotary element comprising a predetermined number of cams adapted to permit feeding movements of said pusher, a surface adapted to permit a dwell of said pusher in extended position, a follower adapted to contact with said surfaces and connected to said pusher, and means adapted to discharge blanks from the tap in discharging position simultaneously with the feed of blanks to the tap in tapping position.

42. In an apparatus of the character described, in combination, a rotatable mandrel, a plurality of taps rotatably mounted thereon, means adapted to rotate said taps, means adapted to intermittently rotate said mandrel and thereby dispose one of said taps in blank-tapping position and another in blank-discharging position, means adapted to feed blanks into engagement with said tap in tapping position, comprising a guideway for blanks, a pusher adapted to reciprocate across said guideway, a rotary element comprising a predetermined number of cams adapted to permit a feeding movement of said pusher, and a surface adapted to permit said pusher to dwell in position across said guideway, a follower adapted to contact with said surfaces and operatively connected to said pusher, and means adapted to discharge blanks from the tap in discharging position simultaneously with the feed of the blanks to the tap in tapping position.

43. In an apparatus of the character described, in combination, a rotatable mandrel, a plurality of taps rotatably mounted thereon, means adapted to rotate said taps, means adapted to intermittently rotate said mandrel and thereby dispose one of said taps in blank-tapping position and another in blank-discharging position, means adapted to feed blanks into engagement with said tap in tapping position comprising a guideway for blanks, a guiding rod, a pusher sleeve reciprocally mounted on said rod, means adapted to cause said sleeve to move successive blanks into engagement with the tap in tapping position, and means adapted to discharge blanks from the tap in discharging position simultaneously with the feed of blanks to the tap in tapping position.

44. In an apparatus of the character described, in combination, a rotatable mandrel, a plurality of taps rotatably mounted thereon, means adapted to rotate said taps, means adapted to intermittently rotate said mandrel and thereby dispose one of said taps in blank-tapping position and another in blank-discharging position, means adapted to lock said mandrel in positions of rest, means adapted to feed blanks into engagement with said tap in tapping position, and means adapted to discharge blanks from the tap in discharging position simultaneously with the feed of blanks to the tap in tapping position.

45. In an apparatus of the character described, in combination, a rotatable mandrel, a plurality of taps rotatably mounted thereon, means adapted to rotate said taps comprising rotatable holders in which the taps are removably fixed, a belt pulley fixed to each holder, an endless belt, means adapted to continuously drive said belt, means adapted to intermittently rotate said mandrel and thereby dispose one of said taps in blank-tapping position and another in blank-discharging position, and cause the pulley of the tap in tapping position to contact said belt and the pulley of the tap in discharging position to be out of contact with said belt, means adapted to feed blanks into engagement with said tap in tapping position, and means adapted to discharge blanks from the tap in discharging position simultaneously with the feed of blanks to the tap in tapping position.

46. In an apparatus of the character described, in combination, a rotatable mandrel, a plurality of taps rotatably mounted thereon, means adapted to rotate said taps, comprising rotatable holders in which the taps are removably fixed, a belt pulley fixed to each holder, an endless belt, means adapted to continuously drive said belt, means adapted to intermittently rotate said mandrel and thereby dispose one of said taps in blank-tapping position and another in blank-discharging position, and cause the pulley of the tap in tapping position to contact said belt and the pulley of the tap in discharging position to be out of contact with said belt, a brake with which the pulley of said tap contacts when in discharging position, means adapted to feed blanks into engagement with said tap in tapping position, and means adapted to discharge blanks from the tap in discharging position simultaneously with the feed of blanks to the tap in tapping position.

47. In an apparatus of the character described, in combination, a rotatable mandrel, a plurality of taps rotatably mounted thereon, means adapted to rotate said taps, means adapted to intermittently rotate said mandrel and thereby dispose one of said taps in blank-tapping position and another in blank-discharging position, means adapted to feed blanks into engagement with said tap in tapping position, and means adapted to discharge blanks from the tap in discharging position simultaneously with the feed of blanks to the tap in tapping position, said mandrel rotating means comprising a continuously operating driving element and a yielding operative connection between the same and said mandrel.

48. In an apparatus of the character described, in combination, a rotatable mandrel, a plurality of taps rotatably mounted thereon, means adapted to rotate said taps, means adapted to intermittently rotate said mandrel and thereby dispose one of said taps in blank-tapping position and another in blank-discharging position, means adapted to feed blanks into engagement with said tap in tapping position, and means adapted to discharge blanks from the tap in discharging position sumultaneously with the feed of blanks to the tap in tapping position, said mandrel rotating means comprising a continuously operating driving element, and a yielding connection therebetween and said mandrel, and means adapted to lock said mandrel in its positions of rest.

49. In an apparatus of the character described, in combination, a rotatable mandrel, a plurality of taps rotatably mounted thereon, means adapted to rotate said taps, means adapted to intermittently rotate said mandrel and thereby dispose one of said taps in blank-tapping position and another in blank-discharging position, means adapted to feed blanks into engagement with said tap in tapping position, means adapted to discharge blanks from the tap in discharging position sumultaneously with the feed of blanks to the tap in tapping position, the means for rotating said mandrel comprising a continuously rotating shaft, a clutch element rotatable therewith, a second clutch element rotatively fixed to said shaft and translatably mounted thereon, driving connections between said rotatable clutch element and said mandrel comprising a rotatably friction plate, and means comprising a cam adapted to couple and uncouple said clutch elements.

50. In an apparatus of the character described, in combination, a rotatable mandrel, a plurality of sets of tap holders rotatably mounted thereon, each comprising a set of tap gripping jaws, means adapted to rotate said jaws, taps held by said jaws, means adapted to intermittently rotate said mandrel and thereby dispose one of said taps in blank-tapping position and another in blank-discharging position, means adapted to feed blanks into engagement with said tap in tapping position, means adapted to discharge blanks from the tap in discharging position while blanks are being fed to the tap in tapping position, and means adapted to successively open and close the jaws of each set when in discharging position comprising a rock lever and means adapted to rock said lever, said holders comprising jaw operating connections adapted to be disposed in the path of movement of said rock lever.

51. In an apparatus of the character described, in combination, a tap support, means adapted to removably hold a plurality of taps on said support, means adapted to coöperate with one of said taps to tap blanks while another of said taps is discharged of blanks, a blank-discharging device, means adapted to cause relative movement of said device and said last-mentioned tap in order to effect the discharge of blanks, means separate from said holding means adapted to removably hold said last-mentioned tap, and means adapted to release said first-mentioned holding means from said last-mentioned tap prior to the discharge of blanks therefrom.

52. In an apparatus of the character described, in combination, a tap support, means adapted to removably hold a plurality of taps on said support, means adapted to coöperate with one of said taps to tap blanks while another of said taps is discharged of blanks, a blank-discharging device, means adapted to cause relative movement of said device and said last-mentioned tap in order to effect the discharge of blanks, and means adapted to remove said last-mentioned tap from said holding means p ior to the discharge of blanks therefrom.

53. In an apparatus of the character described, in combination, a tap support, means adapted to removably hold a plurality of taps on said support, means adapted to coöperate with one of said taps to tap blanks while another of said taps is discharged of blanks, a blank-discharging device, means adapted to cause relative movement of said device and said last-mentioned tap in order to effect the discharge of blanks, and means adapted to remove said last-mentioned tap from said holding means prior to the discharge of blanks therefrom comprising a tap holding member movable toward and from said tap support.

54. In an apparatus of the character described, in combination, a tap support, means adapted to removably hold a plurality of taps on said support, means adapted to coöperate with one of said taps to tap blanks while another of said taps is discharged of blanks, a blank-discharging device, means adapted to cause relative movement of said device and said last-mentioned tap in order to effect the discharge of blanks, and means adapted to remove said last-mentioned tap from said holding means prior to the discharge of blanks therefrom comprising tap gripping jaws movable toward and from said tap support and means adapted to open and close said jaws.

In testimony whereof we affix our signatures in the presence of two witnesses.

WILLIAM L. WARD.
GEORGE M. RUDD.

Witnesses:
ELLWOOD BURDSALL,
HARRY C. MUNSON.